United States Patent [19]

Saito et al.

[11] Patent Number: 4,568,613
[45] Date of Patent: Feb. 4, 1986

[54] COPOLYMER BINDER FOR A MAGNETIC RECORDING MEDIUM

[75] Inventors: Shinji Saito; Hiroshi Ogawa; Yasuo Tamai, all of Kanagawa, Japan

[73] Assignee: Fuji Photo Film Company Limited, Kanagawa, Japan

[21] Appl. No.: 486,178

[22] Filed: Apr. 18, 1983

[30] Foreign Application Priority Data

Apr. 20, 1982 [JP] Japan ................................. 57-65610

[51] Int. Cl.$^4$ ............................................. G11B 5/70
[52] U.S. Cl. .............................. 428/425.9; 252/62.54; 360/134; 360/135; 360/136; 427/128; 428/522; 428/694; 428/900
[58] Field of Search ............ 428/694, 900, 522, 425.9; 252/62.54; 427/128; 360/134-136

[56] References Cited

U.S. PATENT DOCUMENTS

| | | | |
|---|---|---|---|
| 3,728,262 | 4/1973 | Lemmer | 428/900 |
| 4,234,438 | 11/1980 | Horigome | 428/900 |
| 4,352,859 | 10/1982 | Yoda | 428/694 |
| 4,388,376 | 6/1983 | Kubota | 428/694 |
| 4,409,299 | 10/1983 | Mizuno | 428/694 |
| 4,429,010 | 1/1984 | Shibata | 428/425.9 |

Primary Examiner—Ellis P. Robinson
Attorney, Agent, or Firm—Sughrue, Mion, Zinn, Macpeak and Seas

[57] ABSTRACT

A magnetic recording medium is disclosed which is comprised of a support base having positioned thereon a magnetic layer having a ferromagnetic powder dispersed in a binder composition. The binder composition is comprised of a vinyl chloride-vinyl alcohol copolymer in an amount of 40 wt % to about 95 wt %. The copolymer contains 1 wt % to less than 8 wt % of vinyl alcohol component and 0 to 2 wt % of vinyl acetate component. By using the binder composition which includes the copolymer the resulting magnetic recording medium have excellent surface smoothness, good dispersion of ferromagnetic powder, excellent electromagnetic properties, as well as excellent running property and durability.

7 Claims, 1 Drawing Figure

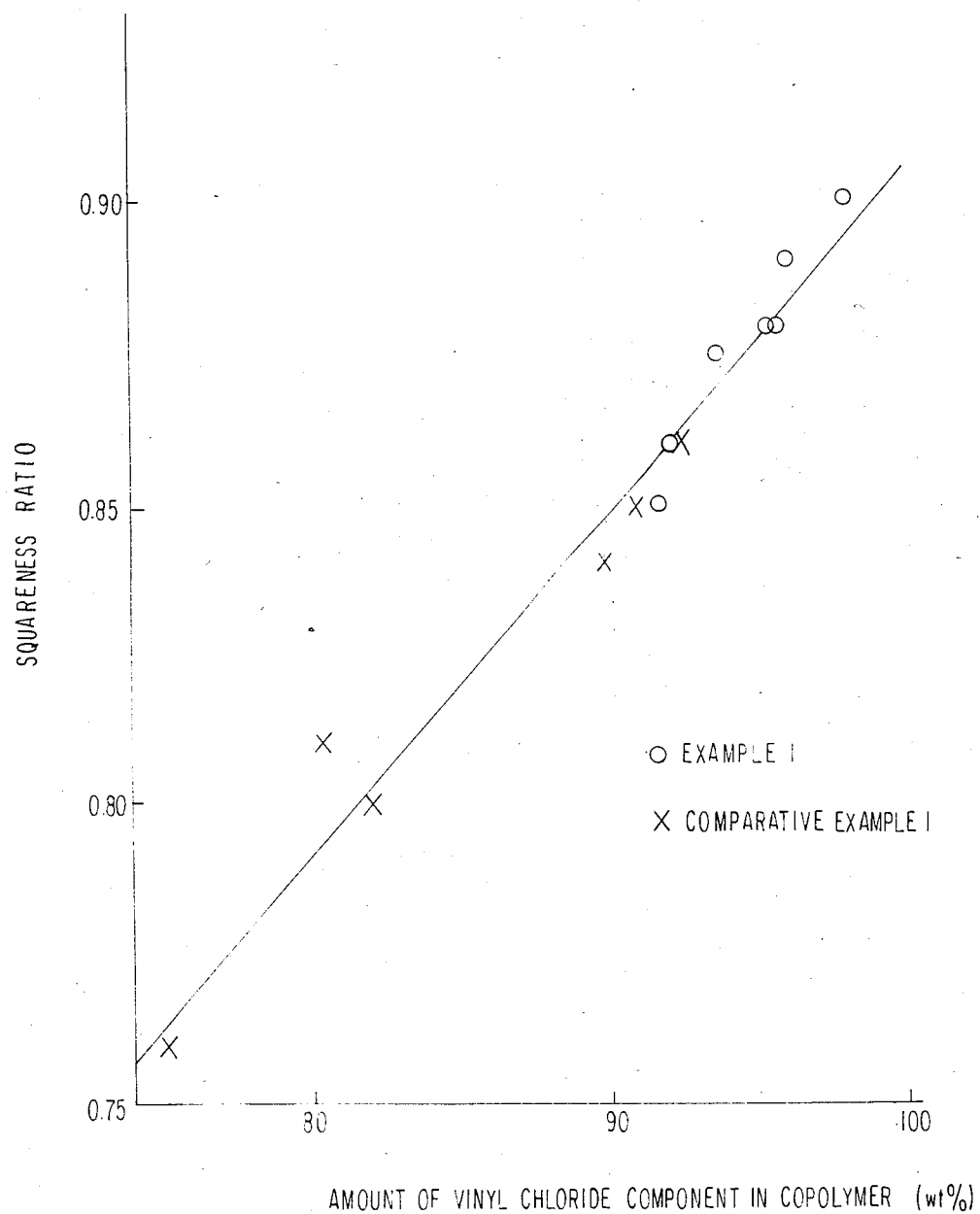

COPOLYMER BINDER FOR A MAGNETIC RECORDING MEDIUM

FIELD OF THE INVENTION

This invention relates to a magnetic recording medium, and more particularly relates to a binder which provides a magnetic recording medium having excellent surface properties, orientation and electromagnetic properties for a magnetic recording medium.

BACKGROUND OF THE INVENTION

With the increased demand for magnetic recording medium such as audio recording tape or a video recording tape, higher standards of such media are being required. More specifically, there is a need to improve electromagnetic properties which make it possible for the media to reproduce an original sound and images, and for the media to have improved running ability and durability.

One factor effecting the above characteristics of magnetic recording tapes is the binder. The electromagnetic characteristics, running ability and durability of magnetic recording tapes prepared by coating a coating composition on a support and drying it are determined by the binder in which a ferromagnetic powder is homogeneously dispersed in a solvent.

Useful binders for the magnetic recording medium include vinyl chloride-vinyl acetate copolymer, which can contain, as a monomer, vinyl alcohol, acrylic acid, acrylate, maleic acid, maleate, etc.; a vinyl chloride-vinylidene chloride copolymer, a vinylidene chloride-acrylonitrile copolymer, nitrocellulose, polyurethane resin and epoxy resin.

A copolymer of vinyl chloride-vinyl acetatevinyl alcohol is the most often used binder. This binder is used due to the presence of an OH group in the vinyl alcohol component of the copolymer of vinyl chloride-vinyl acetate-vinyl alcohol which contributes to providing high dispersibility. It is well known that surface smoothness is improved when an amount of vinyl alcohol component is increased. However, it has been found that with a vinyl chloride-vinyl acetate-vinyl alcohol copolymer prepared by saponifying part of vinyl acetate of a vinyl chloride-vinyl acetate copolymer, the effect of surface smoothness is decreased when an amount of vinyl acetate component is increased. Additionally, electromagnetic properties of the magnetic recording tapes are deteriorated.

It is disclosed in Japanese Patent Application (OPI) Nos. 151067/80 and 7233/81 that a copolymer of which a vinyl acetate component is sufficiently saponified is used as a binder. In the former case the amount of vinyl alcohol component is not less than 8 wt %, and in the latter case the amount of vinyl alcohol component is 8 to 22 wt % and the amount of the unsaponified vinyl acetate component is 0.3 to 0.5 wt % as shown in examples.

It has been found that the dispersibility and surface smoothness of the magnetic recording tapes can be improved by decreasing the amount of the vinyl acetate component which is sufficiently saponified. However, as the result of further investigations it has also been found that the more the vinyl alcohol component is used, the worse orientation is and that the ratio of residual flux density to saturated flux density, that is, the squareness ratio is deteriorated. Accordingly, satisfactory output and input characteristic of the magnetic recording tapes could not be obtained. The reason is unclear but it is believed that a binder is so strongly adsorbed to the surface of the magnetic powder due to the presence of the OH group that the magnetic powder cannot move freely in the coating composition during orientation.

It has further been found that when the amount of the vinyl alcohol component is large, stains occur during tape running at high temperature and humidity and the running property is deteriorated.

SUMMARY OF THE INVENTION

A first object of the invention is to provide a novel magnetic recording medium.

A second object of the invention is to provide a magnetic recording medium having excellent surface smoothness.

A third object of the invention is to provide a magnetic recording medium wherein the ferromagnetic powder is well dispersed.

A fourth object of the invention is to provide a magnetic recording medium wherein the ferromagnetic powder is well oriented.

A fifth object of the invention is to provide a magnetic recording medium having excellent electromagnetic properties.

A sixth object of the invention is to provide a magnetic recording medium having excellent running property and durability.

As the results of thorough investigations the present inventors have found that the above objects can be attained by providing a magnetic recording medium which is prepared by providing on a support a magnetic layer having a ferromagnetic powder dispersed in a binder composition comprising a copolymer of vinyl chloride-vinyl alcohol containing 1 wt % to less than 8 wt % of a vinyl alcohol component and 0 to 2 wt % of the residual vinyl acetate.

BRIEF DESCRIPTION OF THE DRAWING

The FIGURE is a graph showing a relationship between the amount of vinyl chloride component in a copolymer and the squareness ratio in Example 1 and Comparative Example 1.

DETAILED DESCRIPTION OF PREFERRED EMBODIMENTS

In the copolymer of vinyl chloride-vinyl alcohol, the amount of vinyl alcohol component is preferably 3 to 6 wt % and the amount of residual vinyl acetate is preferably not more than 1.0 wt % and more preferably not more than 0.5 wt %. If the amount of vinyl alcohol component is not less than 8 wt %, surface smoothness is not efficiently increased and orientation is deteriorated. If the amount of vinyl alcohol component is less than 1 wt %, sufficient surface smoothness and dispersibility can not be obtained. The residual vinyl acetate component adversely affects the surface smoothness and dispersibility, and it deteriorates orientation as the vinyl alcohol component does. Therefore, the residual vinyl acetate component should preferably be used in an extremely small amount.

The degree of polymerization of the copolymer of vinyl chloride-vinyl alcohol of the invention is preferably about 200 to 700 more preferably about 300 to 500. Where the polymerization degree is not more than about 200, thermal decomposition resistance is deteriorated. Where the polymerization degree is not less than about 700, the dispersibility of the ferromagnetic powder is deteriorated. The number average molecular weight of the copolymer is preferably about 10,000 to 40,000, more preferably about 20,000 to 30,000. The molecular distribution (ratio of weight average molecular weight to number average molecular weight:Mw/Mn) is preferably 1.0 to 3.0.

A vinyl chloride-vinyl alcohol copolymer of the invention is present in an amount of at least about 40 wt %, preferaby about 50 wt % or more, and more preferably about 60 wt % or more based on the weight of the binder composition. If the amount of the copolymer is less than about 40 wt %, the dispersibility of the ferromagnetic powder is deteriorated. If too much of the copolymer is included, the plasticity of the magnetic layer is decreased. Therefore the amount of the copolymer is preferably not more than 95 wt %.

The magnetic recording medium of the invention is prepared by coating on a support a magnetic coating composition having a ferromagnetic powder dispersed in the above copolymer and, if necessary, other resins, with an organic solvent, and drying the coated composition. Additives such as a lubricant and a dispersing agent may be added in the magnetic coating composition in the total amount of not more than 6 wt % based on the weight of the ferromagnetic powder.

The ferromagnetic powder may be $\gamma$-$Fe_2O_3$, Co-modified iron oxide and alloy fine powder containing 60% or more of iron, which are particularly preferred.

Example of resins used with the copolymer of vinyl chloride-vinyl alcohol of the invention include rubbers such as styrene-butadiene rubber, butadiene rubber, isoprene rubber, butyl rubber, chloroprene rubber, isobutyrene rubber, acrylonitrile-butadiene rubber, chlorinated butyl rubber, urethane rubber, acrylic rubber and epichlorohydrin rubber, vinyl chloride-vinylidene chloride copolymer, vinylidene chloride-acrylonitrile copolymer, epoxy resin, ethylene-vinyl acetate copolymer, ethylene-vinyl acetate-vinyl chloride copolymer, polyvinyl butyral resin, polyvinyl acetal resin, methacrylate copolymer, acrylate copolymer, and vinyl chloride-isobutyl vinyl ether copolymer. Of these, the rubbers are preferably used. These resins may be used individually or as a mixture thereof. The resins can be added in an amount of 5 to 60 wt %, preferably less than 50 wt %, more preferably less than 40%, based on the weight of the binder composition.

Polyisocyanate hardening agents can also be included in the coating composition if desired. Polyisocyanate hardening agents are those having at least three isocyanate groups in the molecule, such as reaction product of 3 moles of diisocyanate (such as trylenediisocyanate, xylylene diisocyanate or hexamelene diisocyanate) and 1 mole of trimethylol propane; buret adduct compound of 3 moles of hexamethylene diisocyanate; isocyanurate adduct compound of 3 moles of trylene diisocyanate and 2 moles of hexamethylene diisocyanate; and a polymer compound of diphenylmethane diisocyanate.

These compounds are commercially available under trade names such as "Coronate L", "Coronate HL", "Coronate 2030", "Milionate MR" and "Milionate MTL" which are manufactured by Nippon Polyurethane KK, "Desmodule L", "Desmodule N", "Desmodule IL" and "Desmodule HL" which are manufactured by Sumitomo Bayer Urethane KK, "Takenate D-102", "Takenate D-110N" and "Takenate D-202" which are manufactured by Takeda Pharmaceutical Industries KK.

Polyisocyanate can be used in an amount of not more than about 30 wt % based on the binder composition in this invention. With the increase of more than about 30 wt %, adhesiveness between the magnetic layer and support is decreased.

A ferromagnetic powder, an additive, an organic solvent, and a method for dispersing and coating are disclosed in U.S. Pat. No. 4,135,016 herein incorporated by reference.

The invention will be further explained more in detail by the following examples, but the invention should not be limited thereto. In the examples, "part" means "part by weight".

EXAMPLE 1

| | |
|---|---|
| $\gamma$-$Fe_2O_3$ (Hc 380 Oe, acicular ratio 10/1, average particle length 0.4 $\mu$m) | 100 parts |
| Vinyl chloride-vinyl alcohol copolymer (the ratio is shown in Table 1, the polymerization degree 400) | amount as shown in Table 1 |
| Polyester polyurethane (molecular weight 130,000) | amount as shown in Table 1 |
| Lauric acid | 2 parts |
| Cyclohexanone | 110 parts |
| Methyl ethyl ketone | 170 parts |

The above compositions were introduced into a ball mill, mixed, kneaded, dispersed for 48 hours and then filtered with a filter having an average pore diameter of $3\mu$ to prepare a coating composition for a magnetic layer.

The coating composition obtained was coated in a dry thickness of $5\mu$ by a reverse roll on a polyethylene terephthalate film having a thickness of $7\mu$, subjected to magnetic orientation with an electric magnet of 1000 gauss under undried condition and then dried. After drying, the layer was subjected to super calender treatment to smooth the magnetic layer. The magnetic recording tapes obtained were slit to a width of 3.81 mm to prepare an audio cassette tape (Phillips type compact cassette). The characteristics of thus obtained tape samples are shown in Table 1, "A-1" to "A-7".

COMPARATIVE EXAMPLE 1

The same procedure as in Example 1 was repeated except for using a conventional copolymer of vinyl chloride- vinyl acetate-vinyl alcohol (the ratio shown Table 1) to prepare a cassette tape. The results are shown in Table 1, "B-1" to "B-6".

EXAMPLE 2

| | |
|---|---|
| Co—coated Berthollide iron oxide (Co 3.0 atomic % coated, FeOx x = 1.4, Hc 660, acicular ratio 10/1, average length 0.4 $\mu$m) | 100 parts |
| Vinyl chloride-vinyl alcohol copolymer (the ratio is shown in Table 2, Polymerization degree 400) | amount as shown in Table 2 |
| Polyester polyurethane (molecular weight of 130,000) | amount as shown in Table 2 |
| Oleic acid | 2 parts |
| 2-Ethylhexyl stearate | 0.5 parts |
| Alumina (average diameter 0.5$\mu$) | 4 parts |
| Cyclohexane | 100 parts |
| Methyl ethyl ketone | 150 parts |

The above compositions were kneaded, mixed and dispersed in a ball mill for 48 hours, combined with 6.7 parts (solid content of 5.0 parts) of polyisocyanate compound (Trade name "Coronate L-75" manufactured by Nippon Polyurethane KK.), further mixed, kneaded and dispersed for 1 hour, and filtered with a filter having an average pore diameter of 1μ to prepare a magnetic coating composition for a magnetic layer. The coating composition obtained was coated in a dry thickness of 5μ by a reverse roll on a polyethylene terephthalate film having a thickness of 14 μ, subjected to magnetic orientation with a magnet of 3000 gauss while it was undried, and then dried. The dried film was subjected to a super calender roll treatment to smooth the magnetic layer and slit to a width of ½ inch to prepare a video cassette tape (VHS type video cassette). The characteristics of the video tape was shown in Table 2, "A-8" to "A-10".

COMPARATIVE EXAMPLE 2

The same procedure as in Example 2 was repeated except using a conventional copolymer of vinyl chloride-vinyl acetate-vinyl alcohol (the ratio shown in Table 2) instead of vinyl chloride-vinyl alcohol copolymer used in Example 2 to prepare a video cassette tape. The results are shown in Table 2, "B-7" to "B-10".

The abbreviations and the method for measuring the tape characteristics shown in Tables 1 and 2 are indicated as follows.

Abbreviations
VC: vinyl chloride
VAC: vinyl acetate
VOH: vinyl alcohol
PU: polyester polyurethane

Method for Measurement (a) Surface gloss
The percent total reflection was measured with a standard gloss meter (digital gloss meter "GK 4500" manufactured by Suga Testing Machine Co., Ltd.) at an angle of incidence of 45 degrees and an angle of reflection of 45 degrees.

(b) Squareness ratio:
The ratio of the residual magnetic flux density (Br) to the maximum magnetic flux density (Bm) was measured in an external magnetic field of 1 KOe using a vibratory flux magnetic meter "VSM-3" manufactured by Toei Kogyo Co., Ltd.

(c) Audio running property:
Running tests were conducted with commercially available 100 cassette tape decks at 25° C., 50% RH and at 40° C., 80% RH to see how orderly the tape samples could be wound.
A . . . could be wound orderly.
B . . . could not be wound orderly on 1 to 5 decks.
C . . . could not be wound orderly on 5 to 10 decks.
D . . . could not be wound orderly on not less than 11 decks.

(d) Tape squeal:
The presence of any tape squeal was checked during the tape running tests.
A . . . No tape squeal was heard.
B . . . Occasional squeals were heard on 1 to 2 cassette tapes.
C . . . Occasional squeals were heard on 3 to 5 cassette tapes.
D . . . Occasional squeals were heard on not less than 5 cassette tapes and continuous squeals were heard on 1 to 2 cassette tapes.

(e) Stain:
After evaluation of the tape running property, the head of each deck was checked for the presence of stain.
A . . . Stain was absent or hardly detectable.
B . . . Some but negligible stain.
C . . . Considerable stain.

(f) MOL 315
The maximum output at 315 Hz (distortion degree 3%) was measured with a cassette tape deck "582" manufactured by Nakamichi Co., Ltd. using "Fuji Cassette ER C-90" manufactured by Fuji Photo Film Co., Ltd. as a reference tape that was assumed to produce an output of 0 dB.

(g) SOL 10K
The saturated output at 10 KHZ was measured where the reference tape used above was assumed to deliver an output of 0 dB.

(h) Video running property:
Video tape running property was measured with 50 commercial video cassette decks (VHS type) at 25° C., 50% RH and at 40° C., 80% RH to see if any jitter or skew occurred.
A . . . No jitter nor skew.
B . . . Some but insignificant jittering and skewing.
C . . . Frequent jittering and skewing caused problems.

(i) Still life:
The time (min.) for a serious defect to occur in a picture reproduced in a still mode was measured using a "NV-6600" manufactured by Matsushita Electric Industrial Co., Ltd.

(j) Video output:
The output at 4 MHz was measured using "NV-6600" manufactured by Matsushita Electric Industrial Co., Ltd. using a VHS tape manufactured by Fuji Photo Film Co., Ltd. as a reference tape that was assumed to deliver an output of 0 dB.

(k) S/N ratio:
The S/N ratio at 10 KHz to 4 MHz after visibility correction was measured with "NV-6600" manufactured by Matsushita Electric Industrial Co., Ltd.

TABLE 1

| Sample No. | VC (wt %) | VAC (wt %) | VOH (wt %) | VC.VAC VOH copolymer (part) | PU (part) | Surface gloss | Squareness ratio (Br/Bm) | Audio running property | Stain | Tape squeal | MOL 315 (dB) | SOL 10K (dB) |
|---|---|---|---|---|---|---|---|---|---|---|---|---|
| Example 1 | | | | | | | | | | | | |
| A-1 | 98.0 | 1.0 | 1.0 | 20 | 2 | 140 | 0.90 | A | A | A | +1.3 | +0.6 |
| A-2 | 96.2 | 1.8 | 2.0 | 20 | 2 | 145 | 0.89 | A | A | A | +0.7 | +0.6 |
| A-3 | 95.6 | 0.4 | 4.0 | 20 | 2 | 160 | 0.88 | A | A | A | +1.3 | +1.5 |
| A-4 | 95.3 | 0.2 | 4.5 | 20 | 2 | 165 | 0.88 | A | A | A | +1.3 | +1.5 |
| A-5 | 93.6 | 0.4 | 6.0 | 20 | 2 | 170 | 0.87 | A | A | A | +0.8 | +1.2 |
| A-6 | 92.1 | 0.4 | 7.5 | 20 | 2 | 175 | 0.86 | A | A | A | +0.5 | +1.1 |
| A-7 | 91.7 | 0.8 | 7.5 | 20 | 2 | 170 | 0.85 | A | A | A | +0.5 | +0.9 |

TABLE 1-continued

| Sample No. | VC (wt %) | VAC (wt %) | VOH (wt %) | VC.VAC VOH copolymer (part) | PU (part) | Surface gloss | Squareness ratio (Br/Bm) | Audio running property | Stain | Tape squeal | MOL 315 (dB) | SOL 10K (dB) |
|---|---|---|---|---|---|---|---|---|---|---|---|---|
| Comparative Example 1 | | | | | | | | | | | | |
| B-1 | 92.5 | 3.0 | 4.5 | 20 | 2 | 145 | 0.86 | A | A | A | +0.5 | +0.4 |
| B-2 | 89.8 | 0.2 | 10.0 | 20 | 2 | 175 | 0.84 | B | B | B | +0.1 | +0.2 |
| B-3 | 82.0 | 4.0 | 14.0 | 20 | 2 | 170 | 0.80 | C | C | B | −0.4 | 0.0 |
| B-4 | 75.5 | 12.0 | 12.5 | 20 | 2 | 140 | 0.76 | C | C | C | −1.2 | −0.2 |
| B-5 | 80.5 | 15.0 | 4.5 | 20 | 2 | 130 | 0.81 | C | A | B | −1.8 | −1.2 |
| B-6 | 91.0 | 6.0 | 3.0 | 20 | 2 | 155 | 0.85 | B | A | B | +0.2 | +0.2 |

TABLE 2

| Sample No. | VC (wt %) | VAC (wt %) | VOH (wt %) | VC.VAC. VOH copolymer (part) | PU (part) | Surface gloss | Squareness ratio (Br/Bm) | Video running property | Still life (min.) | Video output (dB) | S/N ratio (dB) |
|---|---|---|---|---|---|---|---|---|---|---|---|
| Example 2 | | | | | | | | | | | |
| A-8 | 96.2 | 1.8 | 2.0 | 20 | 5 | 180 | 0.88 | A | not less than 120 | +1.0 | 52 |
| A-9 | 95.3 | 0.2 | 4.5 | 20 | 5 | 185 | 0.87 | A | not less than 120 | +1.5 | 50 |
| A-10 | 92.1 | 0.4 | 7.5 | 20 | 5 | 190 | 0.86 | A | not less than 120 | +1.0 | 50 |
| Comparative Example 2 | | | | | | | | | | | |
| B-7 | 89.8 | 0.2 | 10.0 | 20 | 5 | 190 | 0.84 | A | 60 | +0.5 | 47 |
| B-8 | 75.5 | 12.0 | 12.5 | 20 | 5 | 170 | 0.80 | B | 20 | −1.5 | 42 |
| B-9 | 80.5 | 15.0 | 4.5 | 20 | 5 | 160 | 0.82 | B | 30 | −0.5 | 46 |
| B-10 | 91.0 | 6.0 | 3.0 | 20 | 5 | 170 | 0.84 | A | 90 | 0.0 | 45 |

From the above examples and comparative examples the following is clear.

The FIGURE is a graph showing the relationship between the amount of vinyl chloride component in the copolymer and the squareness ratio in Example 1 (o mark) and Comparative Example 1 (x mark). It is clear that the greater the amount of vinyl chloride component included, the more the squareness ratio is improved and that the example using the copolymers of the invention is superior to the comparative example using the conventional copolymers in squareness ratio.

While the samples in Exampe 1 except sample "A-6" are inferior to sample "B-2" in Comparative Example 1 in terms of surface gloss, they show markedly high values with respect to squareness. Accordingly, the tapes of the invention are superior in electromagnetic properties. This is because, as mentioned above, that sample "B-2" has excellent surface gloss but has an inferior squareness ratio due to the presence of a large amount of vinyl alcohol component.

More specifically the component ratio of vinyl chloride-vinyl alcohol of the invention provides the surface property and the squareness ratio which in turn provide excellent electromagnetic properties.

With regard to the practical characteristics such as an audio running property, stain or tape squeal, audio tapes "A-1" to "A-7" using vinyl chloride-vinyl alcohol copolymers of the invention are superior to audio tapes "B-1" to "B-6" of Comparative Example 1.

More specifically, it is possible to obtain a magnetic recording medium having superior ability with respect to reproducing original sound, running property and durability as compared with a conventional tape, using the copolymers of vinyl chloride-vinyl alcohol of the invention.

It is apparent from Table 2 that video tapes "A-8" to "A-10" using vinyl chloride-vinyl alcohol copolymers of the invention are far superior to video tapes "B-7" to "B-10" using conventional copolymers of vinyl chloride-vinyl acetate-vinyl alcohol with respect to their squareness ratio, video output and S/N ratio that the video tapes "A-8" to "A-10" are excellent with to their ability to reproduce an original image, as well as provide long still life image and allow for good running property and durability.

It is apparent from the above examples and comparative examples that the binder composition containing a copolymer of vinyl chloride-vinyl alcohol of the invention provides excellent dispersibility of ferromagnetic powder, electromagnetic properties, running property and durability for the magnetic recording medium as compared to the binder composition containing a conventional copolymer of vinyl chloride-vinyl acetate-vinyl alcohol.

While the invention has been described in detail and with reference to specific embodiments thereof, it will be apparent to one skilled in the art that various changes and modifications can be made therein without departing from the spirit and scope thereof.

What is claimed is:

1. A magnetic recording medium, comprising:
   a support base having positioned thereon;
   a magnetic layer having a ferromagnetic powder dispersed in a binder composition comprising a vinyl chloride-vinyl alcohol copolymer containing 1 wt % to less than 8 wt % of vinyl alcohol component and 0 to 2 wt % of vinyl acetate component, said copolymer having a degree of polymerization of from 300 to 500.

2. A magnetic recording medium as claimed in claim 1, wherein the vinyl alcohol component is present in the copolymer in an amount of 3 wt % to 6 wt %.

3. A magnetic recording medium as claimed in claim 1, wherein the copolymer has a molecular distribution (Mw/Mn) within the range of 1.0 to 3.0.

4. A magnetic recording medium as claimed in claim 1, wherein the copolymer is present in the binder composition in an amount of 40 wt % or more based on the weight of the binder composition.

5. A magnetic recording medium as claimed in claim 4, wherein the copolymer is present in the binder composition in an amount of 50 wt % or more based on the weight of the binder composition.

6. A magnetic recording medium as claimed in claim 5, wherein the copolymer is present in the binder composition in an amount of 60 wt % to 95 wt % based on the weight of the binder composition.

7. A magnetic recording medium as claimed in claim 1, wherein the binder composition further comprises a polyisocyanate in an amount of 30 wt % or less based on the weight of the binder composition.

* * * * *